US005644955A

United States Patent [19]
Yamamoto

[11] Patent Number: 5,644,955
[45] Date of Patent: Jul. 8, 1997

[54] STRUCTURE FOR SUPPORTING DRIVING REACTION FORCE ON DIFFERENTIAL HOUSING

[75] Inventor: Kenji Yamamoto, Kariya, Japan

[73] Assignee: Kabushi Kaisha Toyoda Jidoshokki Seisakusho, Kariya, Japan

[21] Appl. No.: 521,685

[22] Filed: Aug. 31, 1995

[30] Foreign Application Priority Data

Sep. 1, 1994 [JP] Japan ..................... 6-208771

[51] Int. Cl.⁶ ............................. B60K 17/16
[52] U.S. Cl. ................. 74/607; 180/352; 180/378
[58] Field of Search .................. 74/606 R, 607; 180/346, 378, 352

[56] References Cited

U.S. PATENT DOCUMENTS

| | | | |
|---|---|---|---|
| 1,779,142 | 10/1930 | Osman | 180/378 X |
| 2,026,228 | 12/1935 | Goerz | 180/378 X |
| 2,570,191 | 10/1951 | Beckwith | 74/607 X |
| 2,776,019 | 1/1957 | Keese | 74/607 X |
| 3,777,838 | 12/1973 | Barnes | 180/352 |
| 4,437,530 | 3/1984 | De Young et al. | 180/378 X |
| 4,699,230 | 10/1987 | Solleder et al. | 180/378 X |

FOREIGN PATENT DOCUMENTS 63-34982  9/1988  Japan.
63-152725 10/1988  Japan.

*Primary Examiner*—Charles A. Marmor
*Assistant Examiner*—Mary Ann Battista
*Attorney, Agent, or Firm*—Brooks Haidt Haffner & Delahunty

[57] ABSTRACT

In a structure for supporting driving reaction force acting upon a differential housing, a first arm portion on a differential carrier or carrier cover connected to the differential housing and a second arm portion on a front axle bracket fixed to a frame of the vehicle overlap each other in a vertical direction and are coupled to each other by means of a driving reaction force receiving bolt. A shim having a notch for putting the driving reaction force receiving bolt therethrough is inserted between the first arm portion and the second arm portion.

10 Claims, 4 Drawing Sheets

STRUCTURE FOR SUPPORTING DRIVING REACTION FORCE ON DIFFERENTIAL HOUSING

BACKGROUND OF THE INVENTION

1. Field of the Invention

The present invention relates to a structure for supporting a driving reaction force acting upon a differential housing of a forklift of the type having an engine and a transmission separated from the differential housing.

2. Description of the Related Art

In a forklift as shown in FIG. 5 where a transmission 2 linked with an engine 1 and a differential housing 3 are located separately from each other in the longitudinal direction of the vehicle, an output shaft 4 of the transmission 2 and a pinion shaft 5 of the differential gear are connected to each other by a propeller shaft 7 through universal joints 6. Such a transmission system with a separately located differential has an advantage that less vibration is transmitted from the engine 1 compared to a system of the type where the transmission 2 and the differential 3 are directly connected to each other.

Supporting structure for the differential housing 3 in a conventional separated-differential type transmission system is shown in detail in FIGS. 6 and 7. The differential housing 3 is rotatably provided between the transversely spaced apart, longitudinally extending frame members 8 of the vehicle, between the left and right front axle brackets 9 which are firmly fixed to the frame 8 of the vehicle. Thus, in order to prevent rotation of the differential housing 3 as it receives a driving reaction force when the driving force from the transmission is transmitted through the propeller shaft 7, a carrier cover 10 linked with the differential housing 3 is coupled to the left and right front axle brackets 9, respectively, by horizontally provided reaction force receiving bolts 11. In other words, the reaction force to driving is borne by the shearing force of the reaction force receiving bolts 11 which are provided at two locations.

Considering that, due to the multiple effects of tolerances of respective component parts, a shift in relative positions of the holes for receiving a reaction force receiving bolt formed respectively on the carrier cover 10 and the front axle bracket 9, the reaction force receiving bolt hole of each front axle bracket 9 is made somewhat larger than the outer diameter of the reaction force receiving bolt 11. For this reason, to prevent play between the reaction force receiving bolt 11 and the front axle bracket 9, the reaction force receiving bolt 11 is fixed with respect to the front axle bracket 9 by a fixing bolt 12. Further, in order to adjust a gap due to dimensional tolerance in the horizontal direction between the front axle bracket 9 and the carrier cover 10, an annular shim 13 as shown in FIG. 8 is inserted into such gap and the reaction force receiving bolt passes through and is tightened via a through hole 13a of the shim 13.

As described above, since the left and right front axle brackets 9 and the carrier cover 10 are coupled, respectively, by the reaction force receiving bolts 11, it has been necessary to set a strict machining tolerance to match the position of the holes for the reaction force receiving bolt. Since the reaction force receiving bolt 11 is provided in the horizontal direction, positioning of the holes for the reaction force receiving bolt at the time of assembly is not easy and makes the assembling operation difficult. Also, it is necessary to fix the reaction force receiving bolts 11 on both sides, respectively, by the fixing bolts 12, to prevent play between the reaction force receiving bolt 11 and the front axle bracket 9. The number of component parts is thereby increased and the structure becomes more complicated. Further, since the gap between the front axle bracket 9 and the carrier cover 10 is to be adjusted by the annular shim 13, the reaction force receiving bolt 11, which has once been tightened, must be pulled out to insert the shim 13 for the adjustment and then the reaction force receiving bolt 11 is tightened again. Time and labor are required for the correction of a gap.

SUMMARY OF THE INVENTION

To solve the problems of the prior art as described, it is an object of the present invention to provide a structure for supporting a driving reaction force on a differential housing, which may be readily assembled by using a simple construction having a small number of component parts without setting a strict machining tolerance and which enables easy adjustment of dimensions an insertion of a shim.

In accordance with the present invention, there is provided a driving reaction force supporting structure for a differential housing for supporting a driving reaction force acting upon the differential housing which is located separately from an engine and a transmission of a forklift. The structure comprises: a first arm portion formed on and projecting horizontally from one of a differential carrier and a carrier cover connected to a differential housing; a second arm portion formed on and extending horizontally from a front axle bracket fixed to a frame of the vehicle to overlap the first arm portion in a vertical direction; and a drive reaction force receiving bolt coupling the first and second arm portions to each other in the vertical direction.

DESCRIPTION OF THE PREFERRED EMBODIMENTS

An embodiment of the present invention will now be described with reference to the accompanying drawings.

Figure 1:
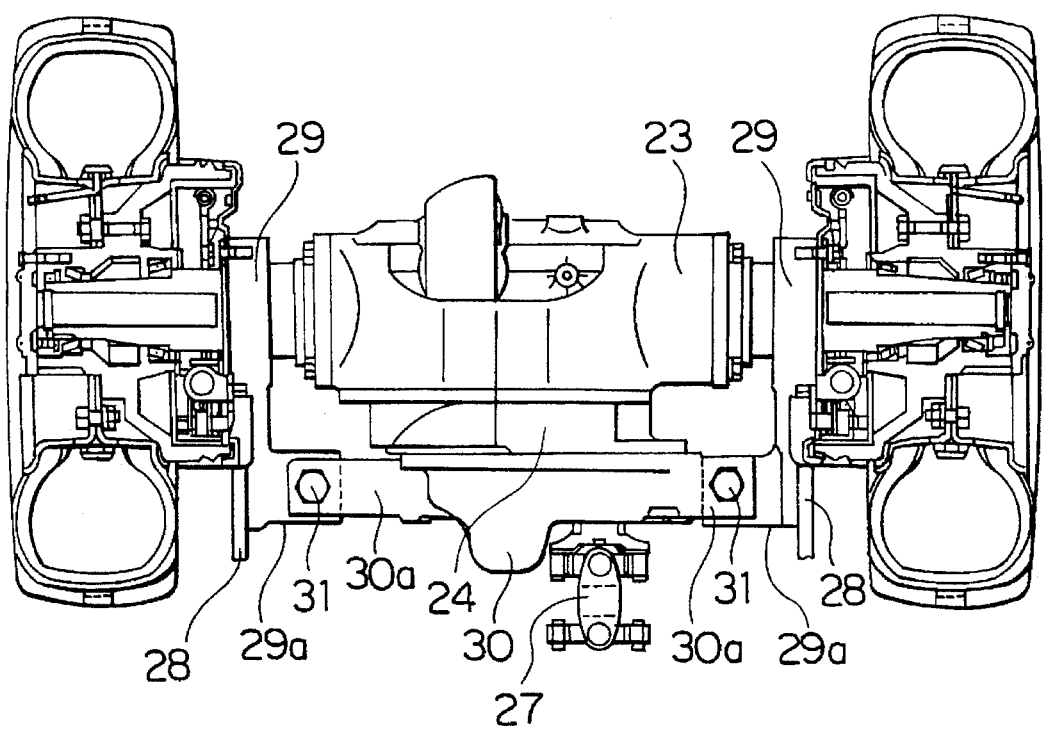
FIGS. 1 and 2 are a partially fragmented top view and a partially fragmented front view, respectively, of a structure for supporting a driving reaction force on a differential housing according to an embodiment of the present invention.
Figure 2:
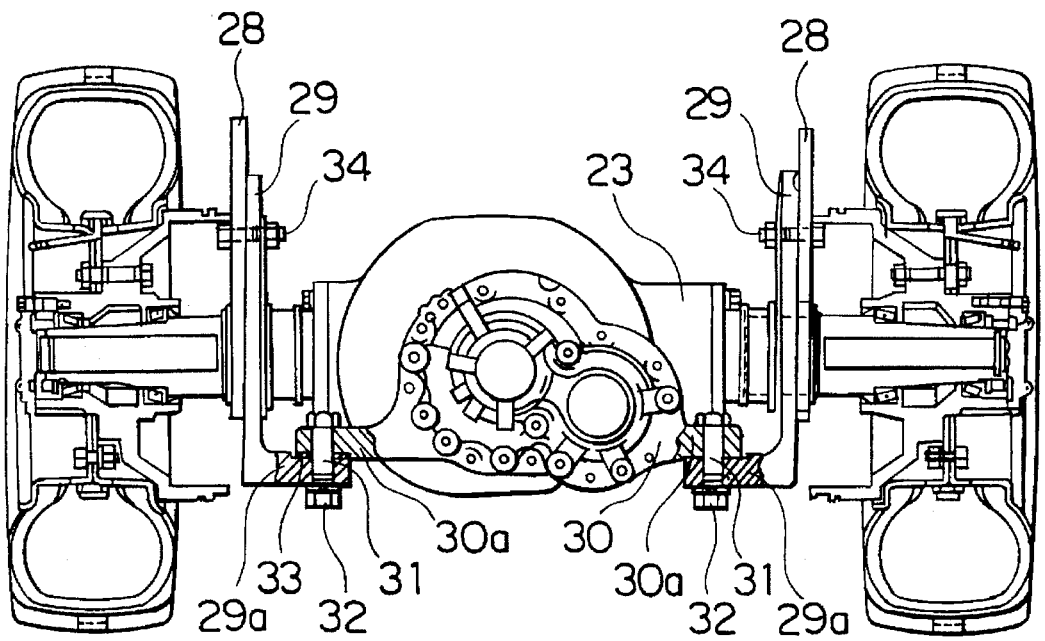

Referring to FIGS. 1 and 2, a differential housing 23 is located separately from an engine and a transmission (not shown) and is rotatably provided with respect to transversly aligned left and right front axle brackets 29 which are fixed to the transversely spaced apart respective side members of a longitudinally extending horizontal frame 28 of the vehicle by means of set bolts 34. Arm portions 29a, horizontally and transversely extended in such a manner as to oppose each other, are formed on each of front axle brackets 29.

A differential carrier 24 and a carrier cover 30 are connected to the differential housing 23, extending therefrom in the longitudinal direction of the vehicle. Formed on the carrier cover 30 are a pair of horizontally and transversely extending arm portions 30a positioned respectively above the corresponding arm portions 29a of the front axle brackets 29. Through holes aligned for receiving a bolt are vertically formed respectively in the vertically overlapping arm portions 29a and 30a which are positioned above and under each other providing a horizontal interface therebetween. A driving reaction force receiving bolt 31 is passed through the aligned through holes and is tightened by a washer and a nut 32. Thereby, the arm portion 30a of the carrier cover 30 and the arm portion 29a of the front axle bracket 29 are coupled to each other in the vertical direction with reference to the horizontal frame 28.

Here, when driving force from the transmission is to be transmitted through a propeller shaft 27, the differential housing 23 receives a driving reaction force in the direction rotating with respect to the front axle bracket 29. Such reaction force is manifested at the arm portion 30a of the carrier cover 30 as a force acting in the vertical direction. In this embodiment, since the arm portion 30a of the carrier cover 30 is coupled to the arm portion 29a of the front axle bracket 29 in the vertical direction, the driving reaction force acting upon the differential housing 23 is borne at the arm portion 29a of the front axle bracket 29 through the arm portion 30a of the carrier cover 30.

Since the arm portion 29a of the front axle bracket 29 and the arm portion 30a of the carrier cover 30 are coupled to each other in the vertical direction, no play occurs even without setting a strict dimensional tolerance for the bolt through holes to be formed on the arm portions 29a and 30a and without providing a fixing bolt for fixing the driving reaction force receiving bolt 31. Further, since the driving reaction force receiving bolt 31 is provided in the vertical direction, it is easy to be assembled.

Figure 3:
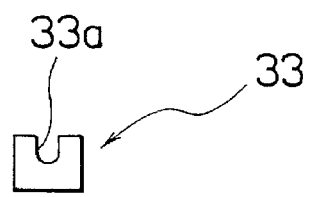
FIG. 3 is a top view showing a shim used in the same embodiment.

In order to correct a gap formed between one arm portion 30a of the carrier cover 30 and the arm portion 29a of the corresponding front axle bracket 29 due to the multiple effects of tolerances of respective component parts, a shim 33 is inserted into such gap. Such shim 33 is formed into a U-like shape having a notch 33a as shown in FIG. 3, the driving reaction force receiving bolt 31 being put through the notch 33a. Using the shim 33 having such shape, it is possible to insert the shim 33 into the gap between the carrier cover 30 and the front axle bracket 29 to perform dimensional adjustment thereof, by only loosening the once attached drive reaction force receiving bolt 31 without pulling it out.

Figure 4:
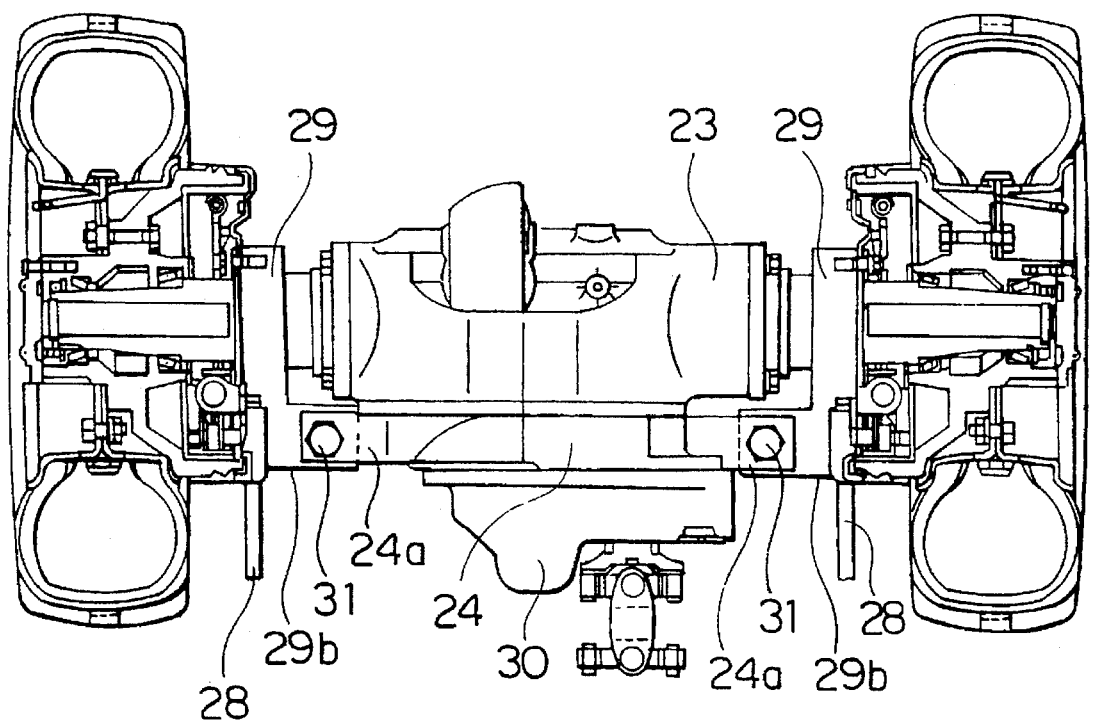
FIG. 4 is a partially fragmented top view showing a driving reaction force supporting structure according to another embodiment of the invention.
Figure 5:
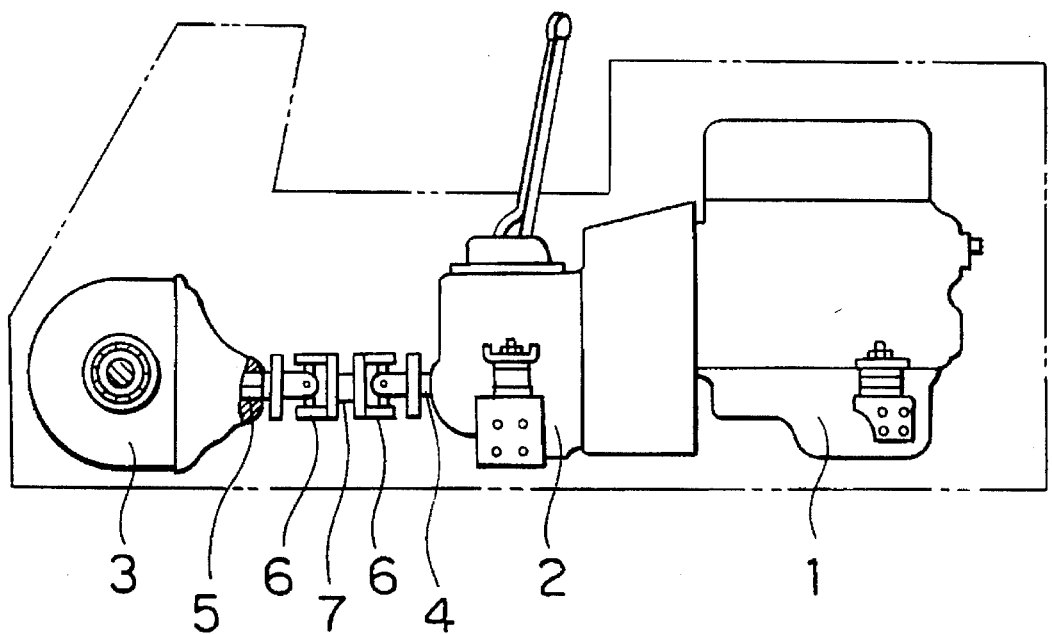
FIG. 5 shows a transmission system of the type with a separately located differential.
Figure 8:
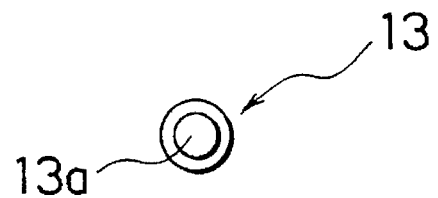
FIG. 8 is a top view showing a shim used in the conventional support structure.
Figure 6:
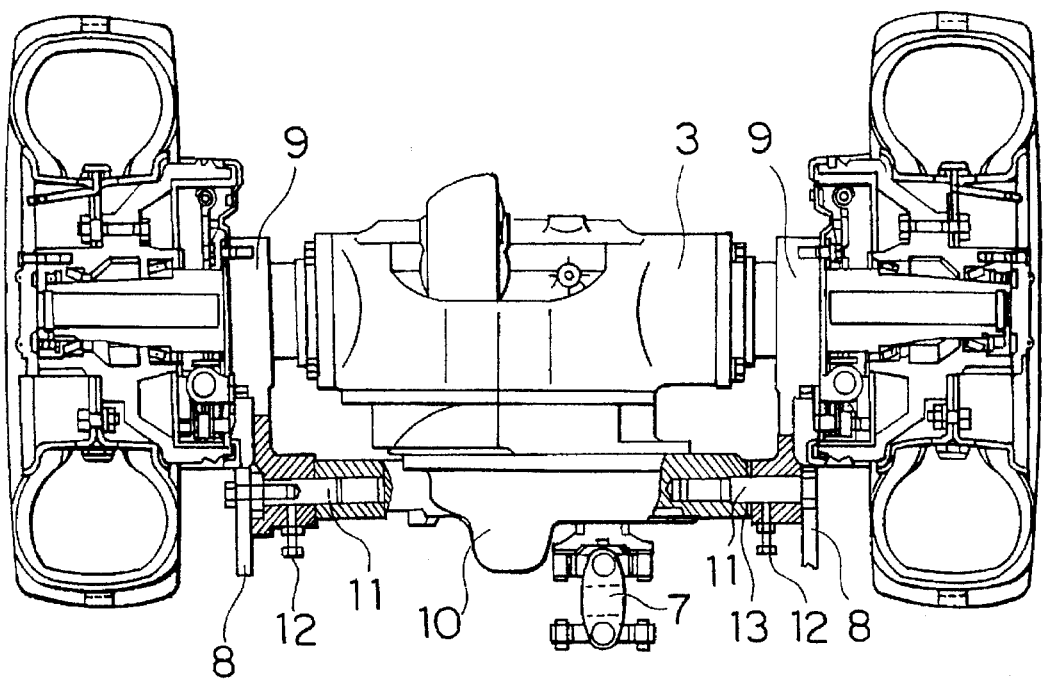
FIGS. 6 and 7 are a partially fragmented top view and a partially fragmented front view, respectively, showing a conventional structure for supporting a driving reaction force on a differential housing.
Figure 7:
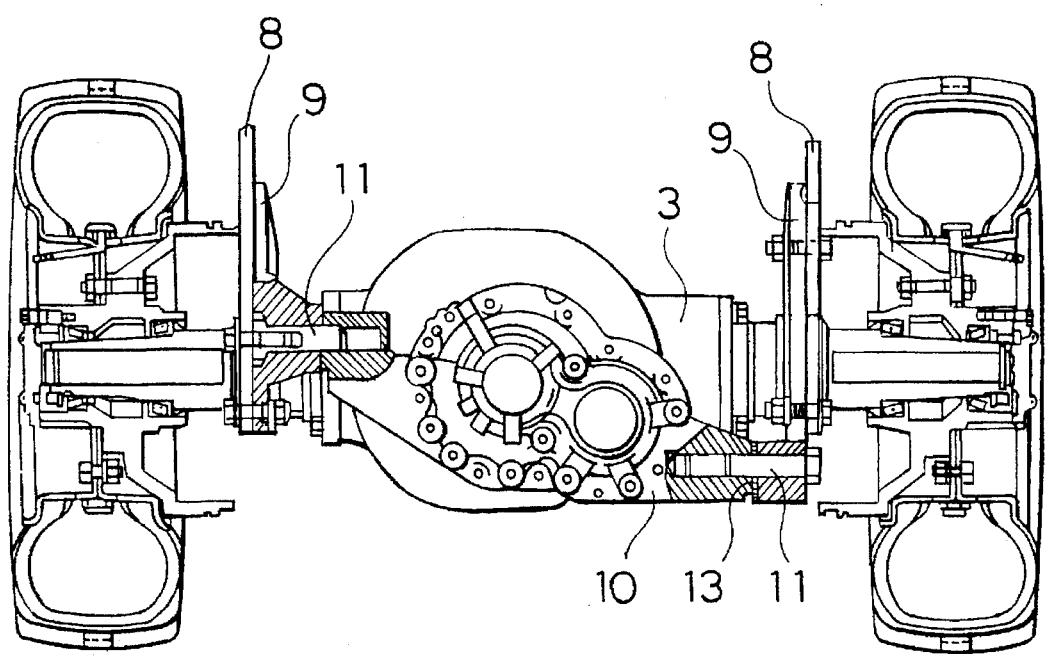

While, in the above embodiment, the arm portion 30a of the carrier cover 30 and the arm portion 29a of the front axle bracket 29 are coupled to each other, the present invention is not limited to this. For example, as shown in FIG. 4, it is also possible that a pair of arm portions 24a projecting transversely toward the left and right sides of the vehicle and in a horizontal direction are formed on the differential carrier 24 which is connected to the differential housing 23, and that these arm portions 24a are coupled in the vertical direction to horizontal arm portions 29b formed on the left and right front axle brackets 29 of the vehicle respectively by means of a driving reaction force receiving bolt 31.

What is claimed is:

1. In a vehicle having a longitudinal direction and a transverse direction, a generally horizontal frame extending in said longitudinal direction and having opposite side members which are spaced apart in said transverse direction, a pair of axle brackets respectively attached to said opposite side members of said frame in transverse alignment with each other, and a differential housing mounted in said frame between said pair of axle brackets and having a differential carrier and a carrier cover connected thereto and extending therefrom in said longitudinal direction of the vehicle, said vehicle further having an engine and a transmission separated in said longitudinal direction from said differential housing, said differential carrier, and said carrier cover, the improvement comprising a structure for supporting a driving reaction force of said vehicle on said differential housing, said structure comprising:

a first arm portion on and extending in said transverse direction of said vehicle from one of said differential carrier and said carrier cover towards one of said axle brackets;

a second arm portion on and extending in said transverse direction of said vehicle from said one axle bracket to overlapping relation with said first arm portion, one of said arm portions above the other in a vertical direction with reference to said horizontal frame whereby the interface between said overlapping arm portions extends substantially in the direction of said horizontal frame; and a driving reaction force receiving bolt extending in said vertical direction and coupling said vertically overlapping first and second arm portions together.

2. A structure according to claim 1, wherein said vehicle is a forklift vehicle.

3. A structure according to claim 1, wherein each of said vertically overlapping first and second arm portions has a vertically extending through-hole in alignment with said vertically extending through-hole in the other, said driving reaction force receiving bolt passing through both of said aligned through-holes.

4. A structure according to claim 3, which further comprises a shim inserted between said vertically overlapping first and second arm portions and adjacent to said bolt, thereby eliminating play between said vertically overlapping arm portions.

5. A structure according to claim 1, which further comprises:

a third arm portion on and extending in said transverse direction from said one of said differential carrier and said carrier cover towards the other of said pair of axle brackets;

a fourth arm portion on and extending in said transverse direction from said other axle bracket to overlapping relation with said third arm portion, one of said third and fourth arm portions above the other in said vertical direction with reference to said horizontal frame whereby the interface between said overlapping third and fourth arm portions extends subtantially in the direction of said horizontal frame; and a second driving reaction force receiving bolt extending in said vertical direction and coupling said vertically overlapping third and fourth arm portions together.

6. A structure according to claim 5, wherein each of said first and third arm portions is on and extends from said differential carrier.

7. A structure according to claim 5, wherein each of said first and third arm portions is on and extends from said carrier cover.

8. A structure according to claim 5, wherein each of said vertically overlapping first and second arm portions has a vertically extending through-hole in alignment with said vertically extending through-hole in the other, the first said driving reaction force receiving bolt passing through both of said aligned through-holes in said overlapping first and second arm portions, and wherein each of said vertically overlapping third and fourth arm portions has a vertically extending through-hole in alignment with said vertically extending through-hole in the other, said second driving reaction force receiving bolt passing through both of said aligned through-holes in said overlapping third and fourth arm portions.

9. A structure according to claim 8, wherein said first arm portion vertically overlaps said second arm portion, and said third arm portion vertically overlaps said fourth arm portion.

10. A structure according to claim 8, which further comprises a shim having a notch therein and inserted between said vertically overlapping first and second arm portions with the first said driving reaction force receiving bolt passing through said notch, and a second shim having a notch therein and inserted between said vertically overlapping third and fourth arm portions with the second said driving reaction force receiving bolt passing through said notch in said second shim, thereby eliminating play between said vertically overlapping first and second arm portions and between said vertically overlapping third and fourth arm portions.

* * * * *